(12) United States Patent
Lee et al.

(10) Patent No.: US 8,952,900 B2
(45) Date of Patent: Feb. 10, 2015

(54) TOUCH SCREEN DISPLAY APPARATUS

(75) Inventors: Moon-Jae Lee, Yongin (KR); Won-Jun Song, Yongin (KR); Sun-Hee Lee, Yongin (KR); Young-Hee Lee, Yongin (KR); Mu-Hyun Kim, Yongin (KR); Hye Dong Kim, Yongin (KR); Ji-Young Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 860 days.

(21) Appl. No.: 12/852,702

(22) Filed: Aug. 9, 2010

(65) Prior Publication Data

US 2011/0037716 A1 Feb. 17, 2011

(30) Foreign Application Priority Data

Aug. 11, 2009 (KR) ........................ 10-2009-0074007

(51) Int. Cl.
*G06F 3/041* (2006.01)

(52) U.S. Cl.
CPC .................................. *G06F 3/0412* (2013.01)
USPC ............. 345/173; 345/76; 345/107; 349/115; 174/250; 445/23

(58) Field of Classification Search
USPC .................................................. 345/173, 206
See application file for complete search history.

(56) References Cited

U.S. PATENT DOCUMENTS

| | | | |
|---|---|---|---|
| 5,736,282 A | 4/1998 | Tamura et al. | |
| 2004/0174324 A1* | 9/2004 | Yamazaki et al. | 345/76 |
| 2005/0098207 A1 | 5/2005 | Matsumoto et al. | |
| 2007/0063985 A1* | 3/2007 | Yamazaki et al. | 345/173 |
| 2007/0215377 A1* | 9/2007 | Aoki | 174/250 |
| 2008/0163923 A1 | 7/2008 | Park et al. | |
| 2008/0292538 A1 | 11/2008 | Minachi et al. | |
| 2009/0161051 A1* | 6/2009 | Fukunaga et al. | 349/115 |
| 2009/0215350 A1* | 8/2009 | Takei et al. | 445/23 |
| 2009/0225045 A1* | 9/2009 | Liu et al. | 345/173 |
| 2009/0267891 A1* | 10/2009 | Ali | 345/107 |
| 2010/0001969 A1* | 1/2010 | Saito et al. | 345/173 |

FOREIGN PATENT DOCUMENTS

| | | |
|---|---|---|
| JP | 61-084729 A | 4/1986 |
| JP | 06-102994 | 4/1994 |
| JP | 11-352710 | 12/1999 |
| JP | 2000-292257 A | 10/2000 |
| JP | 2004-002874 | 1/2004 |

(Continued)

OTHER PUBLICATIONS

English-language abstract of KR Patent No. KR 10-0216930.

(Continued)

*Primary Examiner* — Gerald Johnson
(74) *Attorney, Agent, or Firm* — Christie, Parker & Hale, LLP (57) ABSTRACT

A touch screen display apparatus for easily sensing the touch of a user. The touch screen display apparatus includes: a substrate; a display unit formed on the substrate; and a touch panel disposed to face the display unit, where the touch panel comprises a sealing substrate, a first electrode formed on the sealing substrate, a second electrode spaced apart from the first electrode, and a light receiving unit comprising an organic material interposed between the first electrode and the second electrode.

22 Claims, 6 Drawing Sheets

(56) References Cited

FOREIGN PATENT DOCUMENTS

| | | |
|---|---|---|
| JP | 2005-293074 | 10/2005 |
| JP | 2005-327943 | 11/2005 |
| JP | 2007-271781 A | 10/2007 |
| JP | 2008-233379 A | 10/2008 |
| KR | 1999-024361 | 4/1999 |
| KR | 10-2005-0045889 | 5/2005 |
| KR | 10-2006-0049236 | 5/2006 |
| KR | 10-2006-0073644 | 6/2006 |
| KR | 10-2008-0065120 | 7/2008 |

OTHER PUBLICATIONS

JP Office Action dated Mar. 21, 2012 regarding JP Application No. 2010-127648, 2 pages.

JPO Office action dated Mar. 19, 2013, for corresponding Japanese Patent application 2010-127648, (2 pages).

Japanese Office action dated Jan. 14, 2014, for corresponding Japanese Patent application 2010-27648, (3 pages).

English-language abstract of KR Patent No. KR 10-0216930, Feb. 1999.

* cited by examiner

TOUCH SCREEN DISPLAY APPARATUS

CROSS-REFERENCE TO RELATED APPLICATION

This application claims the benefit of Korean Application No. 10-2009-0074007, filed Aug. 11, 2009 in the Korean Intellectual Property Office, the disclosure of which is incorporated herein by reference.

BACKGROUND OF THE INVENTION

1. Field of the Invention

Aspects of the present invention relate to a touch screen display apparatus, and more particularly, to a touch screen display apparatus for easily sensing the touch of a user.

2. Description of the Related Art

Most recent display apparatuses include touch panel functions. When the touch panel functions are incorporated in a display apparatus, the display apparatus may function as an input device through contacting a panel of the display apparatus by use of a person's finger or a pen.

A touch panel may be classified as an external touch panel or as internal touch panel based on the location of the panel for sensing the touch of a user. An external touch panel may be a pressure type, an electric field type, or a resistive film type, where a pressure type touch panel senses change of pressure by a touch, an electric field type touch panel senses an electric field changed by a touch, and a resistive film type touch panel senses resistance changed by a touch. An internal touch panel may be an auto brightness control (ABC) type or a P-I-N photodiode (junction) type.

In an external touch panel, a panel separate from the display device is included, and thus the thickness of the entire touch screen display apparatus increases and the manufacturing process is complicated.

However, suitable materials that may be used in an internal touch panel are limited and the panel's ability to sense external light is low such that there is a limit to current touch screen display apparatuses having desired performance characteristics.

SUMMARY OF THE INVENTION

Aspects of the present invention provide a touch screen display apparatus for easily sensing the touch of a user.

An aspect of the present invention provides a touch screen display apparatus including: a substrate; a display unit formed on the substrate; and a touch panel disposed to face the display unit, where the touch panel comprises a sealing substrate, a first electrode formed on the sealing substrate, a second electrode spaced apart from the first electrode, and a light receiving unit comprising an organic material and interposed between the first electrode and the second electrode.

The light receiving unit may include a phthalocyanine compound containing at least one metal selected from the group consisting of copper (Cu), iron (Fe), nickel (Ni), cobalt (Co), manganese (Mn), aluminum (Al), palladium (Pd), tin (Sn), indium (In), lead (Pb), titanium (Ti), rubidium (Rb), vanadium (V), gallium (Ga), terbium (Tb), cerium (Ce), lanthanum (La), and zinc (Zn).

The light receiving unit may be formed of a bi-layer comprising a layer formed of a phthalocyanine compound containing at least one material selected from the group consisting of copper (Cu), iron (Fe), nickel (Ni), cobalt (Co), manganese (Mn), aluminum (Al), palladium (Pd), tin (Sn), indium (In), lead (Pb), titanium (Ti), rubidium (Rb), vanadium (V), gallium (Ga), terbium (Tb), cerium (Ce), lanthanum (La), and zinc (Zn) and a layer formed of C60 fullerene (hereafter C60).

The light receiving unit may include a mixing layer mixed with C60 and a phthalocyanine compound containing at least one metal selected from the group consisting of copper (Cu), iron (Fe), nickel (Ni), cobalt (Co), manganese (Mn), aluminum (Al), palladium (Pd), tin (Sn), indium (In), lead (Pb), titanium (Ti), rubidium (Rb), vanadium (V), gallium (Ga), terbium (Tb), cerium (Ce), lanthanum (La), and zinc (Zn).

The first electrode and the second electrode may each be formed as stripes where the first electrode extends in one direction and the second electrode extends in another direction such that the electrodes cross each other.

The light receiving unit may be disposed to correspond to an area where the first electrode and the second electrode cross each other.

The display unit may include light emitting units on a non-light emitting unit, and the first electrode, the second electrode, and the light receiving unit may be formed to correspond to exposed regions of the non-light emitting unit.

An electrode that is disposed closer to external light from among the first electrode and the second electrode may be formed as a transmissive electrode so that external light penetrates through the transmissive electrode.

An electrode that is disposed closer to external light from among the first electrode and the second electrode may include at least one oxide selected from the group consisting of indium tin oxide (ITO), indium zinc oxide (IZO), zinc oxide (ZnO), Al-doped zinc oxide (AZO), and indium oxide ($In_2O_3$).

An electrode that is disposed farther from external light from among the first electrode and the second electrode may include a metal.

The first electrode may be formed on the sealing substrate to face the display unit.

The first electrode may be formed on a surface opposite to the surface facing the display unit on the sealing substrate.

The display unit may include an organic light emitting device (OLED).

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures. Moreover, it is to be understood that where is stated herein that one layer is "formed on" or "disposed on" a second layer, the first layer may be formed or disposed directly on the second layer or there may be an intervening layer between the first layer and the second layer. Further, as used herein, the term "formed on" is used with the same meaning as "located on" or "disposed on" and is not meant to be limiting regarding any particular fabrication process.

Figure 1:
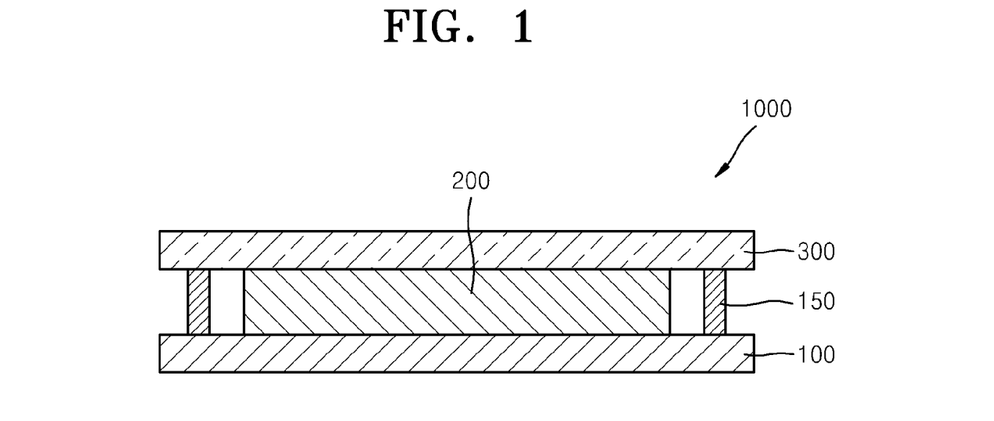
FIG. 1 is a cross-sectional view schematically illustrating a touch screen display apparatus according to an embodiment of the present invention.

FIG. 1 is a cross-sectional view schematically illustrating a touch screen display apparatus 1000 according to an embodiment of the present invention. Referring to FIG. 1, the touch screen display apparatus 1000 includes a substrate 100, a display unit 200, and a touch panel 300.

The substrate 100 may be formed of a transparent glass material, for example $SiO_2$, as a main component. However, the substrate 100 is not limited thereto and may be formed of a transparent plastic material. Here, the plastic material for forming the substrate 100 may be an organic material selected from the group consisting of polyethersulfone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), triacetyl cellulose (TAC), cellulose acetate propionate (CAP), and mixtures thereof, which are insulating organic materials.

Also, the substrate 100 may be formed of a metal. When a metal is used to form the substrate 100, the substrate 100 may include at least one material selected from the group consisting of carbon, iron, chrome, manganese, nickel, titanium, molybdenum, stainless steel, an INVAR® (Imphy Alloys) alloy, an INCONEL® (Special Metals Corp.) alloy, and a KOVAR® (Carpenter Technology Corp.) alloy. The substrate 100 may be also formed of a foil.

The display unit 200 is formed on the substrate 100. The display unit 200 is formed to emit visible light and may include various types of devices such as an organic light emitting device (OLED), a liquid crystal device, or an electron emitter.

The touch panel 300 is formed on the display panel 200. The touch panel 300 functions as an input device by touch of a user and also seals the display unit 200. The substrate 100 and the touch panel 300 are bonded to each other by a sealant 150. In order to form the sealant 150, a glass frit may be used. Materials for forming the sealant 150 may include an organic material, an inorganic material, and a mixture of an organic material and an inorganic material.

Figure 2:
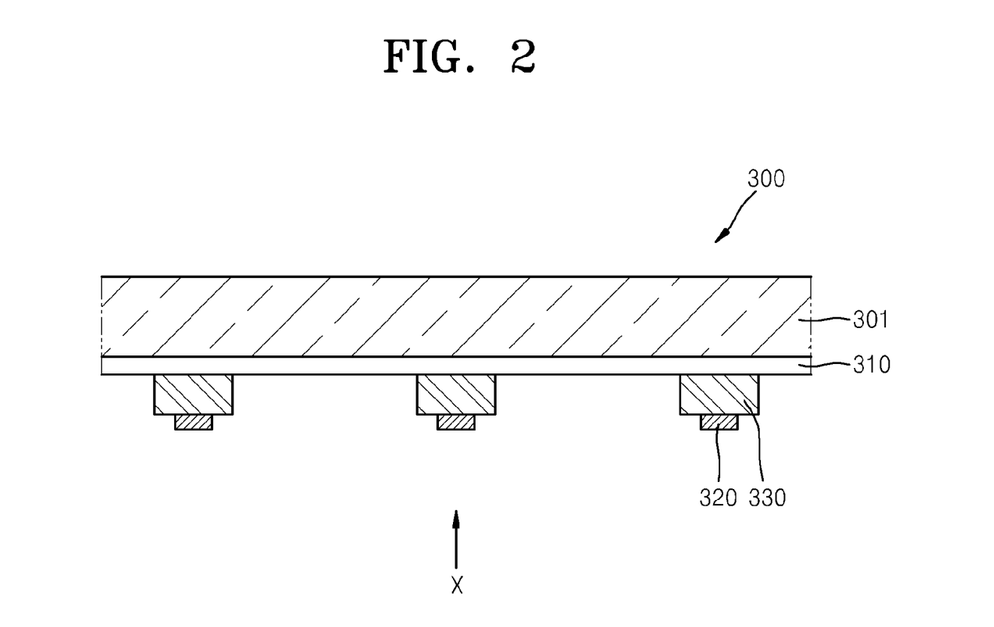
FIG. 2 is an enlarged cross-sectional view of the touch panel of FIG. 1 in more detail.
Figure 3:
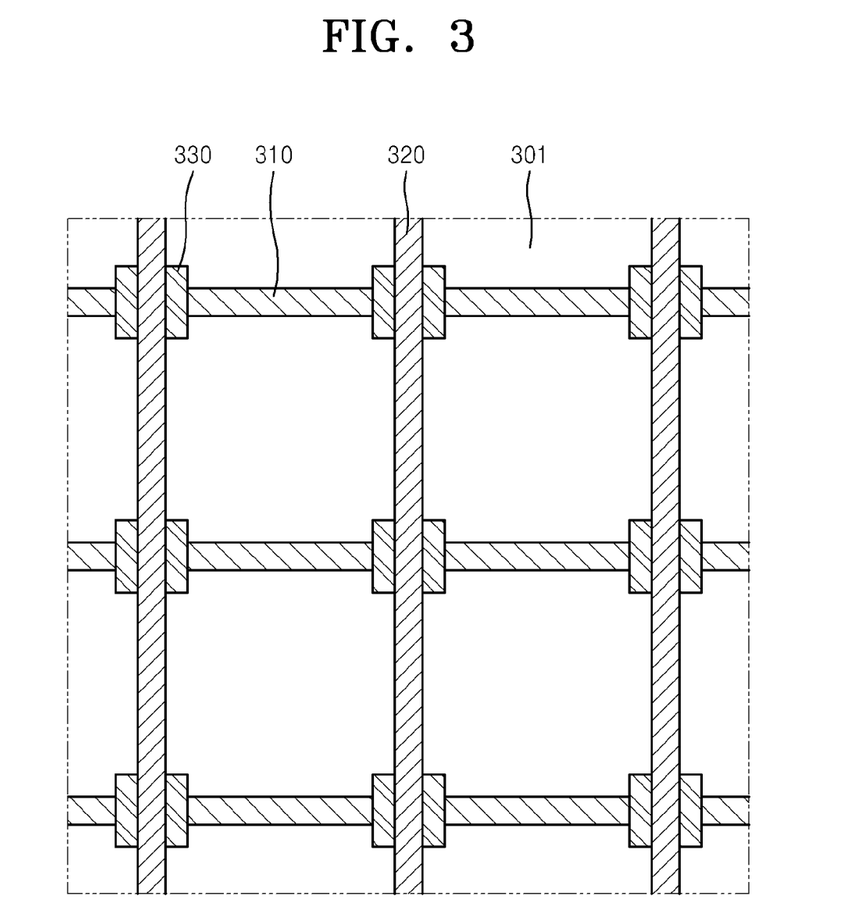
FIG. 3 is a plan view of the touch panel of FIG. 2 viewed from the direction X of FIG. 2.

FIG. 2 is an enlarged cross-sectional view of the touch panel 300 of FIG. 1 in more detail and FIG. 3 is a plan view of the touch panel 300 viewed from the direction X in FIG. 2. Referring to FIGS. 2 and 3, the touch panel 300 includes a sealing substrate 301, a first electrode 310, a second electrode 320, and a light receiving unit 330.

The sealing substrate 301 is disposed to face the substrate 100. The sealing substrate 301 is formed of a transparent material that may protect the display unit 200 from moisture and oxygen from the outside. Thus, the sealing substrate 301 may be formed of an inorganic material such as a glass, an organic material such as a plastic, or a stacked structure of a plurality of organic and inorganic materials.

The first electrode 310, the light receiving unit 330, and the second electrode 320 are sequentially formed in this order on the sealing substrate 301 toward the display unit 200. An electrode that is disposed relatively close to external light from among the first electrode 310 and the second electrode 320 is formed as a transmissive electrode so that external light may penetrate through. Accordingly, the external light may be easily incident onto the light receiving unit 330.

The first electrode 310 is formed as a stripe extended along on the sealing substrate 301. The first electrode 310 is formed as a transmissive electrode so that external light may penetrate through. Accordingly, the first electrode 310 may include at least one oxide selected from the group consisting of indium tin oxide (ITO), indium zinc oxide (IZO), zinc oxide (ZnO), Al-doped zinc oxide (AZO), and indium oxide ($In_2O_3$).

The second electrode 320 is formed as a stripe and is spaced apart from the first electrode 310. The second electrode 320 may include a metal and may be, for example, aluminum (Al). The second electrode 320 is disposed to cross the first electrode 310.

The light receiving unit 330 is interposed between the first electrode 310 and the second electrode 320. More specifically, the light receiving unit 330 is disposed between the first electrode 310 and the second electrode 320 where the first electrode 310 and the second electrode 320 cross each other. A power source may be applied to the light receiving unit 330 through the first electrode 310 and the second electrode 320.

The light receiving unit 330 includes an organic material for sensing external light. For example, the light receiving unit 330 includes a phthalocyanine compound containing at least one metal selected from the group consisting of copper (Cu), iron (Fe), nickel (Ni), cobalt (Co), manganese (Mn), aluminum (Al), palladium (Pd), tin (Sn), indium (In), lead (Pb), titanium (Ti), rubidium (Rb), vanadium (V), gallium (Ga), terbium (Tb), cerium (Ce), lanthanum (La), and zinc (Zn).

Also, the light receiving unit 330 may be formed of a bi-layer respectively including a phthalocyanine compound containing at least one metal selected from the group consisting of copper (Cu), iron (Fe), nickel (Ni), cobalt (Co), manganese (Mn), aluminum (Al), palladium (Pd), tin (Sn), indium (In), lead (Pb), titanium (Ti), rubidium (Rb), vanadium (V), gallium (Ga), terbium (Tb), cerium (Ce), lanthanum (La), and zinc (Zn) and C60 or one mixing layer mixed with the phthalocyanine compound and C60.

The first electrode 310, the second electrode 320, and the light receiving unit 330 function as an optical sensor for sensing external light. The touch panel 300 including the first electrode 310, the second electrode 320, and the light receiving unit 330 sense the touch of a user by sensing the incident amount of external light changed by the touch of the user.

In particular, in the light receiving unit 330, controlling selection of the metals included in the phthalocyanine compound may determine the detection band of incident external light. For example, the phthalocyanine compound including copper (Cu) absorbs visible light in a band of about 600 nm to about 800 nm and the phthalocyanine compound including tin (Sn) absorbs near infrared ray in a band of about 800 nm to about 1000 nm. Since selection of the metals included in the phthalocyanine compound may be controlled, the light receiving unit 330 may be realized as an optical sensor for detecting wavelength in a user desired band.

Figures 4, 5:
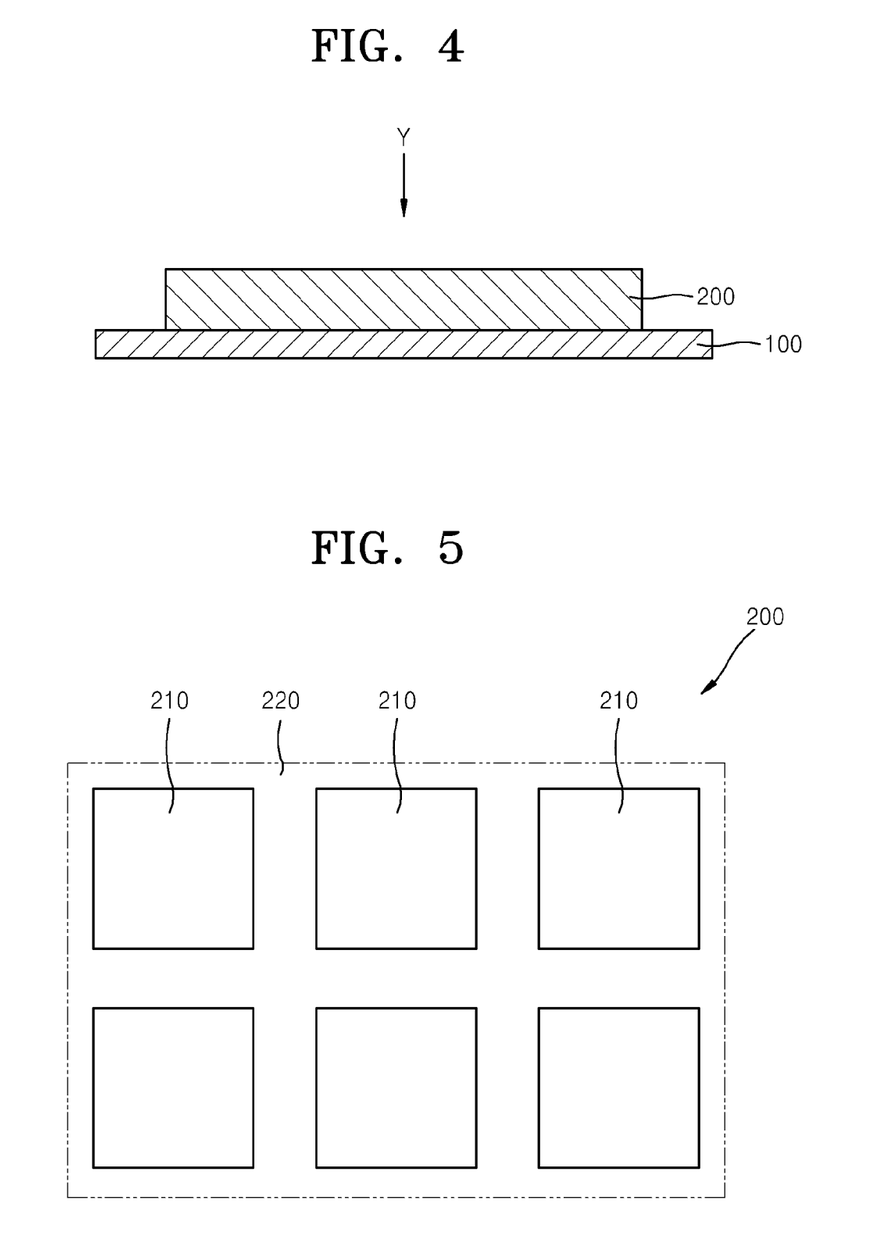
FIG. 4 is a cross-sectional view of the display unit of FIG. 1.
FIG. 5 is a plan view of the display unit of FIG. 4 viewed from the direction Y of FIG. 4.

FIG. 4 is a cross-sectional view of the display unit 200 of FIG. 1 and FIG. 5 is a plan view of the display unit 200 of FIG. 4 viewed from the direction Y in FIG. 4. Referring to FIG. 5, the display unit 200 includes light emitting units 210 on a non-light emitting unit 220. The light emitting units 210 are areas where visible light is generated, whereas the non-light emitting unit 220 is an area where visible light is not generated. For example, each of the light emitting units 210 may be sub-pixels and the non-light emitting unit 220 may be an area between each of the sub-pixels.

Figure 6:
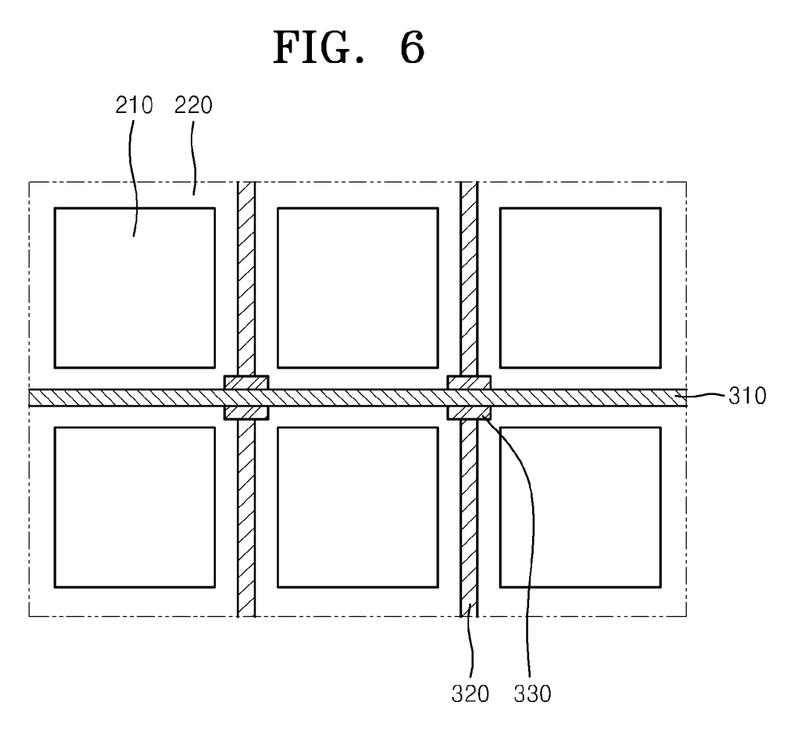
FIG. 6 is a plan view for illustrating location relations between a first electrode, a second electrode, a light receiving unit, and a display unit.

FIG. 6 is a plan view for describing location relations between a plurality of the first electrodes 310, a plurality of the second electrodes 320, a plurality of the light receiving units 330, and the display unit 200. FIG. 6 is a plan view viewed from the sealing substrate 301. The substrate 100 and the sealing substrate 301 are not illustrated for convenience of description.

Referring to FIG. 6, the first electrodes 310, the second electrodes 320, and the light receiving units 330 are disposed to correspond to the non-light emitting unit 220. Accordingly, transmission of visible light generated in the display unit 200 is improved. In FIG. 6, the first electrodes 310 and the second electrodes 320 are formed at sides of each of the light emitting units 210; however, the present invention is not limited thereto. That is, in order to reduce the number of the light receiving units 330, the first electrodes 310 and the second electrodes 320 may be formed in each of the plurality of light emitting units 210.

Figure 7:
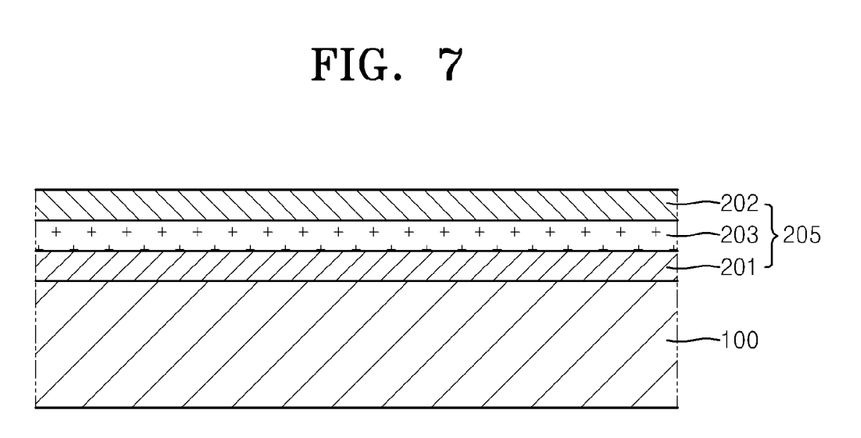
FIGS. 7 through 9 are cross-sectional views schematically illustrating examples of the display unit of FIG. 1.

The touch screen display apparatus 1000 according to the present embodiment may include any of various forms of the display unit 200 and may be, for example, the display unit 200 including an OLED. FIG. 7 is a cross-sectional view schematically illustrating the display unit 200 including an OLED. Referring to FIG. 7, an OLED 205 is formed on the substrate 100. The OLED 205 includes an anode electrode 201, a cathode electrode 202, and an intermediate layer 203. The locations of the anode electrode 201 and the cathode electrode 202 may be interchanged.

The intermediate layer 203 includes an organic light emitting layer, wherein the organic light emitting layer emits visible light when voltage is applied thereto from the anode electrode 201 and the cathode electrode 202. When the organic light emitting layer of the intermediate layer 203 is formed of a low molecular organic material, a hole transport layer (HTL) and a hole injection layer (HIL) are stacked between the anode electrode 201 and the organic light emitting layer with the HTL closer to the organic light emitting layer, and an electron transport layer (ETL) and an electron injection layer (EIL) are formed between the cathode electrode 202 and the organic light emitting layer with the ETL closer to the organic light emitting layer. In addition, various other layers may be stacked, if necessary. The intermediate layer 203 may include copper phthalocyanine (CuPc), N,N'-Di(naphthalene-1-yl)-N,N'-diphenyl-benzidine (α-NPB), or tris-8-hydroxyquinoline aluminum (Alq3).

When the organic light emitting layer of the intermediate layer 203 is formed of a polymer organic material, only a hole transport layer (HTL) may be formed toward the anode electrode from the organic light emitting layer. The hole transport layer (HTL) is formed on the anode electrode 201 by using poly-(2,4)-ethylene-dihydroxy thiophene (PEDOT) or polyaniline (PANI) through inkjet printing or spin coating and the organic light emitting layer may be formed by using poly-p-phenylene (PPV), soluble PPV's, cyano-PPV, or polyfluorene. A color pattern may be formed by using a general method such as inkjet printing, spin coating, or thermal transferring using laser.

Figure 8:
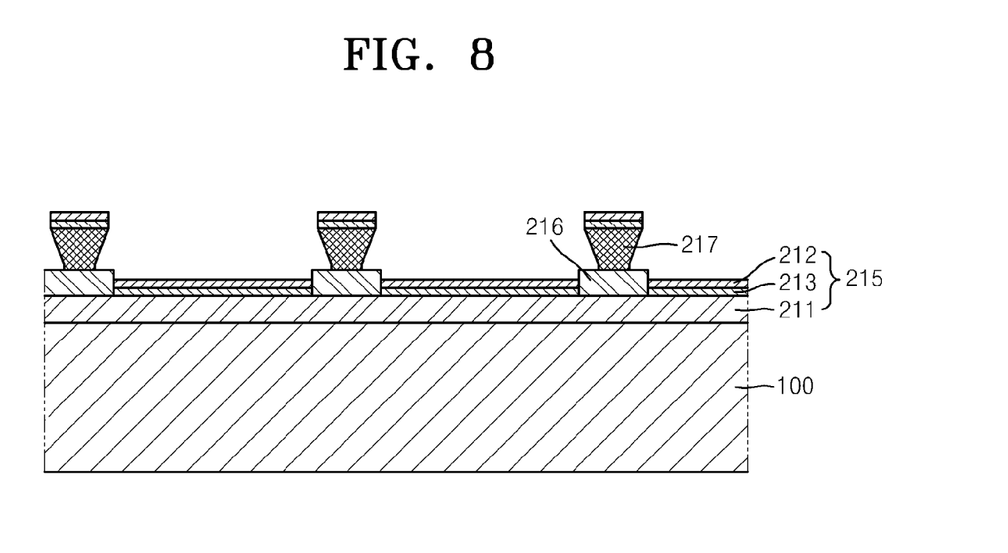

The OLED 205 may be, for example, a passive matrix (PM) type OLED or an active matrix (AM) type OLED. FIG. 8 is a cross-sectional view of the display unit 200 including a PM type OLED 215.

Referring to FIG. 8, the OLED 215 is formed on the substrate 100. In particular, an anode electrode 211 is formed on the substrate 100 in a predetermined stripe pattern and internal insulating layers 216 are formed on the anode electrode 211 so as to partition the anode electrode 211. Also, separators 217 are formed crossing the anode electrode 211 and are formed on the internal insulating layers 216 so as to be used to pattern an intermediate layer 213 and a cathode electrode 212. The intermediate layer 213 and the cathode electrode 212 are patterned to cross the anode electrode 211 by the separators 217. In some cases, the intermediate layer 213 and the cathode electrode 212 may be patterned without the separators 217. The locations of the anode electrode 211 and the cathode electrode 212 may be interchanged.

Figure 9:
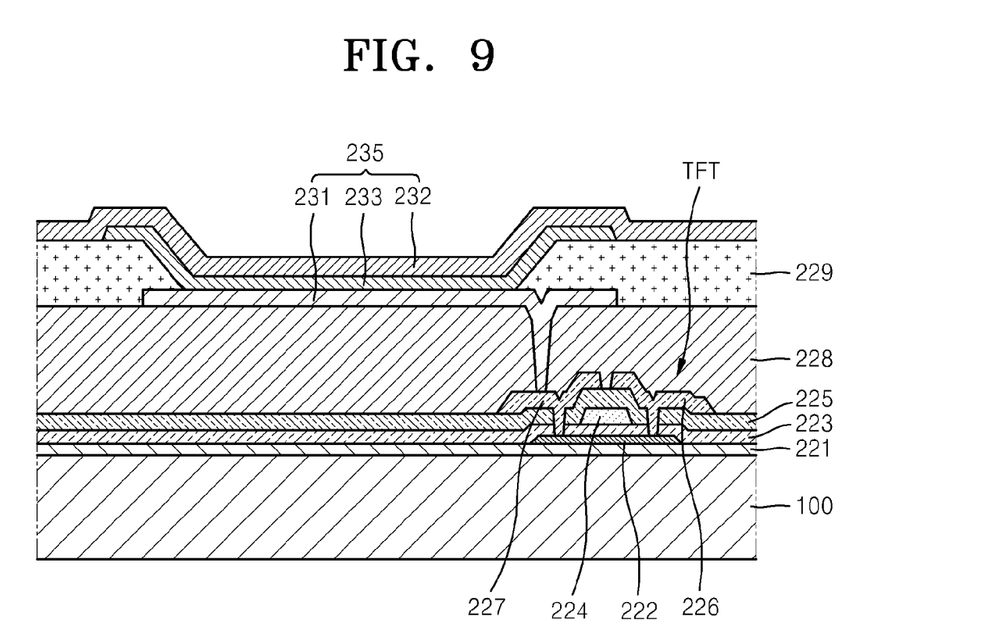

FIG. 9 is a cross-sectional view of the display unit 200 including an AM type OLED 235. For convenience of description, only one sub-pixel of the display unit 200 is illustrated in FIG. 9. Referring to FIG. 9, a buffer layer 221 is formed on the substrate 100 in order to make a surface over the substrate 100 smooth and to prevent impurities from penetrating the substrate 100. The buffer layer 221 may be formed of $SiO_2$ and/or $SiNx$.

A thin film transistor (TFT) is formed on the buffer layer 221. At least one TFT is formed in each sub-pixel and one of the TFTs is electrically connected to the OLED 235, thereby functioning as a driving circuit unit.

More specifically, an active layer 222 having a predetermined pattern is formed on the buffer layer 221. The active layer 222 may be formed of an inorganic semiconductor such as amorphous silicon or polycrystalline silicon (polysilicon) or an organic semiconductor and includes a source region, a drain region, and a channel region (not numbered).

The source and drain regions may be formed by doping the active layer 222 formed of amorphous silicon or polysilicon with impurities. If the active layer 222 is doped with boron (B), which is a group 13 element, a p-type semiconductor may be formed and if the active layer 222 is doped with nitrogen (N), which is a group 15 element, an n-type semiconductor may be formed.

A gate insulating layer 223 is formed on the active layer 222 and a gate electrode 224 is formed on a predetermined region of the gate insulating layer 223. The gate insulating layer 223 is used to insulate the active layer 222 from the gate electrode 224 and may be formed of an organic material or an inorganic material such as $SiNx$ or $SiO_2$.

The gate electrode 224 may be formed of a metal such as Au, Ag, Cu, Ni, Pt, Pd, Al, or Mo, or a metal alloy such as Al:Nd or Mo:W; however, the present invention is not limited thereto. The gate electrode 224 may be formed of various materials in consideration of adhesion to an adjacent layer, flatness of stacked layers, electric resistance, and processability. The gate electrode 224 is connected to a gate line (not shown) that applies a TFT on/off signal.

An interlayer insulating layer 225 including contact holes is formed on the gate electrode 224. The interlayer insulating layer 225 is formed for a source electrode 226 and a drain electrode 227 to respectively contact the source region and the drain region of the active layer 222. Materials for forming the source electrode 226 and the drain electrode 227 may include Al, Mo, or an alloy formed of at least two metals such an Al:Nd alloy or a MoW alloy, in addition to Au, Pd, Pt, Ni, Rh, Ru, Ir, or Os.

The TFT formed as described above is protected by being covered by a passivation layer 228. The passivation layer 228 may include an inorganic insulating layer and/or an organic insulating layer. The inorganic insulating layer may include $SiO_2$, SiNx, SiON, $Al_2O_3$, $TiO_2$, $Ta_2O_5$, $HfO_2$, $ZrO_2$, barium strontium titanate (BST), or lead zirconate titanate (PZT) and the organic insulating layer may include a general commercial polymer such as polymethyl methacrylate (PMMA) or polystyrene (PS), a polymer derivative having a phenol group, an acrylic polymer, an imide based polymer, an aryl ether based polymer, an amide based polymer, a fluorine based polymer, a p-xylene based polymer, a vinyl alcohol based polymer, or a blend thereof. The passivation layer 228 may be formed of a complex stacked layer of the inorganic layer and the organic layer.

A via hole is formed in the passivation layer 228 so as to expose the drain electrode 227 and the OLED 235 is formed. The OLED 235 includes an anode electrode 231, an intermediate layer 233, and a cathode electrode 232. The anode electrode 231 is electrically connected to the drain electrode 227 through the via hole.

Then, a pixel define layer 229 is formed by using an insulating material so as to cover the anode electrode 231. A predetermined opening is formed in the pixel define layer 229 so as to expose the anode electrode 231. The intermediate layer 233 is formed on the exposed anode electrode 231. Then, the cathode electrode 232 is formed to cover all pixels. The locations of the anode electrode 231 and the cathode electrode 232 may be interchanged.

The touch screen display apparatus 1000 according to the present embodiment senses a change in an amount of external light received by the light receiving unit 330 occurring due to the approach or touch of an object when an object such as a user's finger approaches or contacts a surface thereof, that is, the touch panel 300. Then, the touch screen display apparatus 1000 senses the change and outputs coordinates and pressure of the location where the touch of the object exists. Accordingly, the touch screen display apparatus 1000 may easily sense the touch of the user.

Since the sealing substrate 301, which seals the display unit 200, is used to form the touch panel 300 in the touch screen display apparatus 1000 according to the present embodiment, the touch screen display apparatus 1000 may be thin. In the touch screen display apparatus 1000 according to the present embodiment, the first electrode 310 and the second electrode 320 cross each other and thus the structure of a circuit for sensing the touch may be simple.

Figure 10:
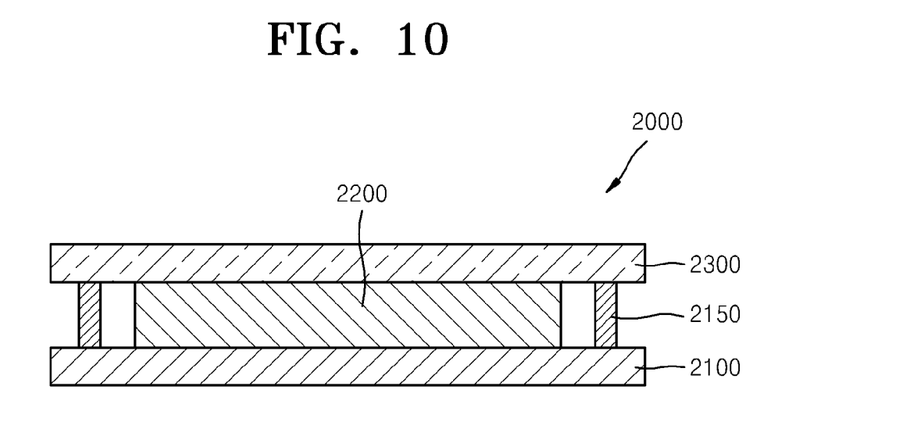
FIG. 10 is a cross-sectional view schematically illustrating a touch screen display apparatus according to another embodiment of the present invention.
Figure 11:
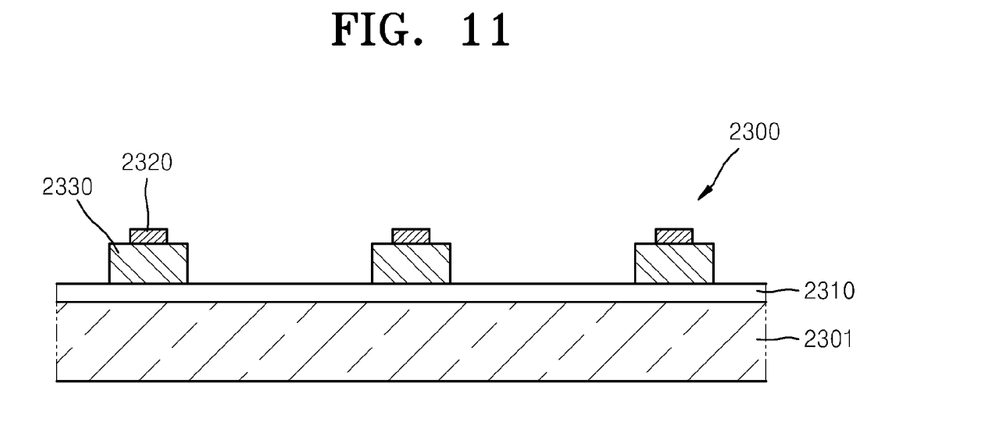
FIG. 11 is an enlarged cross-sectional view of a touch panel of FIG. 10 in more detail.

FIG. 10 is a cross-sectional view schematically illustrating a touch screen display apparatus 2000 according to another embodiment of the present invention and FIG. 11 is an enlarged cross-sectional view of a touch panel 2300 of FIG. 10 in more detail. For convenience of description, only differences from the previous embodiment will be described.

The touch screen display apparatus 2000 according to the present embodiment includes a substrate 2100, a display unit 2200, and the touch panel 2300. The substrate 2100 and the touch panel 2300 are bonded to each other by a sealant 2150.

The touch panel 2300 in the touch screen display apparatus 2000 is different from the touch panel 300 in the previous embodiment. Referring to FIG. 11, the location of a first electrode 2310 in the touch panel 2300 is different from the location of the first electrode 310 in the touch panel 300.

The first electrode 2310 is formed on a surface opposite to a surface facing the display unit 2200 on a sealing substrate 2301. The first electrode 2310, a light receiving unit 2330, and a second electrode 2320 are sequentially formed in this order on the surface opposite to the surface facing the display unit 2200 on the sealing substrate 2301.

The first electrode 2310 is formed as a stripe. The first electrode 2310 may include a metal and may be, for example, aluminum (Al).

The second electrode 2320 is formed as a transmissive electrode so that external light may penetrate through. Thus, the second electrode 2320 may include at least one oxide selected from the group consisting of indium tin oxide (ITO), indium zinc oxide (IZO), zinc oxide (ZnO), Al-doped zinc oxide (AZO), and indium oxide ($In_2O_3$). The second electrode 2320 is spaced apart from the first electrode 2310 and crosses the first electrode 2310.

The light receiving unit 2330 is interposed between the first electrode 2310 and the second electrode 2320. More specifically, the light receiving unit 2330 is disposed between the first electrode 2310 and the second electrode 2320 where the first electrode 2310 and the second electrode 2320 cross each other. The light receiving unit 2330 includes an organic material for sensing external light. The detailed structure of the light receiving unit 2330 is the same as the light receiving unit 330 in the previous embodiment and thus description thereof is not provided.

Although not illustrated, a protective layer that may allow external light to penetrate through may be formed on the second electrode 2320. The protective layer protects the first electrode 2310, the second electrode 2320, and the light receiving unit 2330 from a shock by the touch of the user or from impurities from the outside.

The touch screen display apparatus according to aspects of the present invention may easily sense the touch of a user.

Also, in the touch screen display apparatus according to aspects of the present invention, the light receiving unit is formed on the sealing substrate in the display apparatus and thus a separate panel is not needed such that the touch screen display apparatus may be thin and process efficiency is improved.

In addition, in the touch screen display apparatus according to aspects of the present invention, a first electrode and a second electrode cross each other so that a separate internal circuit for sensing the touch is not needed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A touch screen display apparatus comprising:
a substrate;
a display unit formed on the substrate; and
a touch panel disposed to face the display unit,
wherein the touch panel comprises a sealing substrate and a light sensor for sensing light, which comprises a first electrode formed on the sealing substrate, a second electrode spaced apart from the first electrode, and a light receiving unit comprising an organic material and interposed between the first electrode and the second electrode.

2. The touch screen display apparatus of claim 1, wherein the light receiving unit comprises a phthalocyanine compound containing at least one metal selected from the group consisting of copper (Cu), iron (Fe), nickel (Ni), cobalt (Co), manganese (Mn), aluminum (Al), palladium (Pd), tin (Sn), indium (In), lead (Pb), titanium (Ti), rubidium (Rb), vanadium (V), gallium (Ga), terbium (Tb), cerium (Ce), lanthanum (La), and zinc (Zn).

3. The touch screen display apparatus of claim 2, wherein the light receiving unit is formed of a bi-layer comprising a layer formed of a phthalocyanine compound containing at least one material selected from the group consisting of copper (Cu), iron (Fe), nickel (Ni), cobalt (Co), manganese (Mn), aluminum (Al), palladium (Pd), tin (Sn), indium (In), lead (Pb), titanium (Ti), rubidium (Rb), vanadium (V), gallium (Ga), terbium (Tb), cerium (Ce), lanthanum (La), and zinc (Zn) and a layer formed of C60.

4. The touch screen display apparatus of claim 2, wherein the light receiving unit comprises a mixing layer mixed with C60 and a phthalocyanine compound containing at least one metal selected from the group consisting of copper (Cu), iron (Fe), nickel (Ni), cobalt (Co), manganese (Mn), aluminum (Al), palladium (Pd), tin (Sn), indium (In), lead (Pb), titanium (Ti), rubidium (Rb), vanadium (V), gallium (Ga), terbium (Tb), cerium (Ce), lanthanum (La), and zinc (Zn).

5. The touch screen display apparatus of claim 1, wherein the first electrode and the second electrode are each formed as stripes where the first electrode extends in one direction and the second electrode extends in another direction such that the electrodes cross each other.

6. The touch screen display apparatus of claim 5, wherein the light receiving unit is a plurality of light receiving units disposed to correspond to areas where the first electrode and the second electrode cross each other.

7. The touch screen display apparatus of claim 1, wherein the display unit comprises light emitting units on a non-light emitting unit, and the first electrode, the second electrode, and the light receiving unit are formed to correspond to exposed regions of the non-light emitting unit.

8. The touch screen display apparatus of claim 1, wherein the electrode that is disposed closer to external light from among the first electrode and the second electrode is formed as a transmissive electrode so that external light penetrates through the transmissive electrode.

9. The touch screen display apparatus of claim 1, wherein the electrode that is disposed closer to external light from among the first electrode and the second electrode comprises at least one oxide selected from the group consisting of indium tin oxide (ITO), indium zinc oxide (IZO), zinc oxide (ZnO), Al-doped zinc oxide (AZO), and indium oxide ($In_2O_3$).

10. The touch screen display apparatus of claim 1, wherein the electrode that is disposed farther from external light from among the first electrode and the second electrode comprises a metal.

11. The touch screen display apparatus of claim 1, wherein the first electrode is formed on the sealing substrate to face the display unit.

12. The touch screen display apparatus of claim 1, wherein the first electrode is formed on a surface opposite to the surface facing the display unit on the sealing substrate.

13. The touch screen display apparatus of claim 1, wherein the display unit comprises an organic light emitting device (OLED), a liquid crystal device or an electron emitter.

14. The touch screen display apparatus of claim 13, wherein the display unit comprises an organic light emitting device (OLED).

15. The touch screen display apparatus of claim 14, wherein the OLED is a passive matrix type OLED or an active matrix type OLED.

16. A method of manufacture for a touch screen display apparatus comprising:
forming a display panel on a substrate;
forming a touch panel on the substrate to face the display unit; and bonding the display panel and the substrate with a sealant, wherein: the touch panel comprises a sealing substrate and a light sensor for sensing light, which comprises a first electrode formed on the sealing substrate, a second electrode spaced apart from the first electrode, and a light receiving unit comprising an organic material and interposed between the first electrode and the second electrode, all facing in the direction of the display panel, and the display panel comprises a plurality of light emitting units on a non-light emitting unit, with the plurality of light emitting units facing the touch panel.

17. The method of claim 16, wherein the plurality of light receiving units comprise a phthalocyanine compound containing at least one metal selected from the group consisting of copper (Cu), iron (Fe), nickel (Ni), cobalt (Co), manganese (Mn), aluminum (Al), palladium (Pd), tin (Sn), indium (In), lead (Pb), titanium (Ti), rubidium (Rb), vanadium (V), gallium (Ga), terbium (Tb), cerium (Ce), lanthanum (La), and zinc (Zn).

18. The method of claim 16, wherein the first electrode and the second electrode are each formed as stripes where the first electrode extends in one direction and the second electrode extends in another direction such that the electrodes cross each other.

19. The method of claim 18, wherein the light receiving unit is a plurality of light receiving units disposed to correspond to areas where the first electrode and the second electrode cross each other.

20. The method of claim 16, wherein the display unit comprises light emitting units on a non-light emitting unit, and the first electrode, the second electrode, and the light receiving unit are formed to correspond to exposed regions of the non-light emitting unit.

21. The method of claim 16, wherein the display unit comprises an organic light emitting device (OLED), a liquid crystal device or an electron emitter.

22. The method of claim 21, wherein the display unit comprises an organic light emitting device (OLED).

* * * * *